No. 699,601. Patented May 6, 1902.
T. P. & H. WEICHEL.
CORN HARVESTER AND HUSKER.
(Application filed Sept. 25, 1901.)
(No Model.) 4 Sheets—Sheet 3.
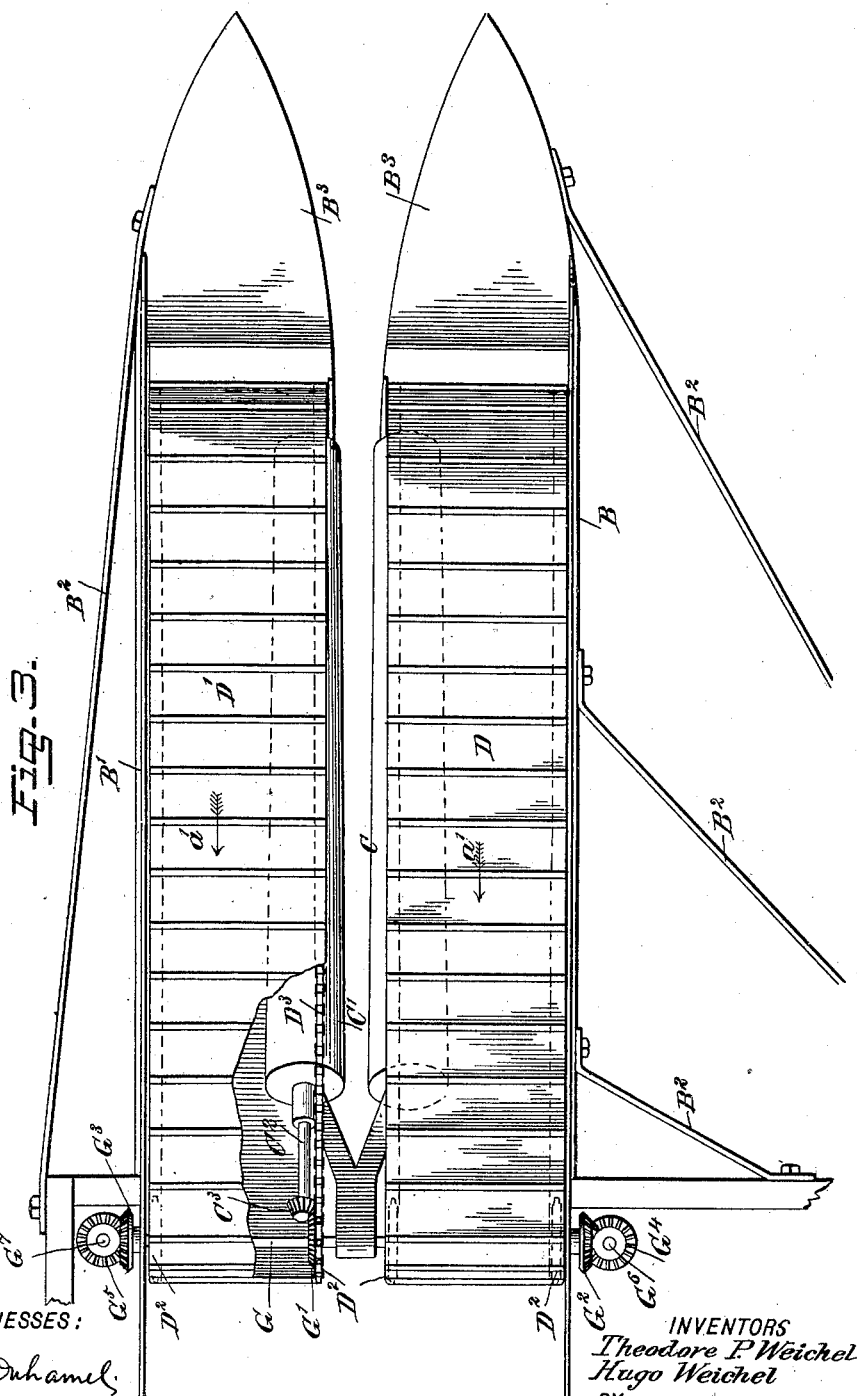
WITNESSES:
INVENTORS
Theodore P. Weichel
Hugo Weichel
BY
ATTORNEYS No. 699,601. Patented May 6, 1902.
T. P. & H. WEICHEL.
CORN HARVESTER AND HUSKER.
(Application filed Sept. 25, 1901.)
(No Model.) 4 Sheets—Sheet 4.
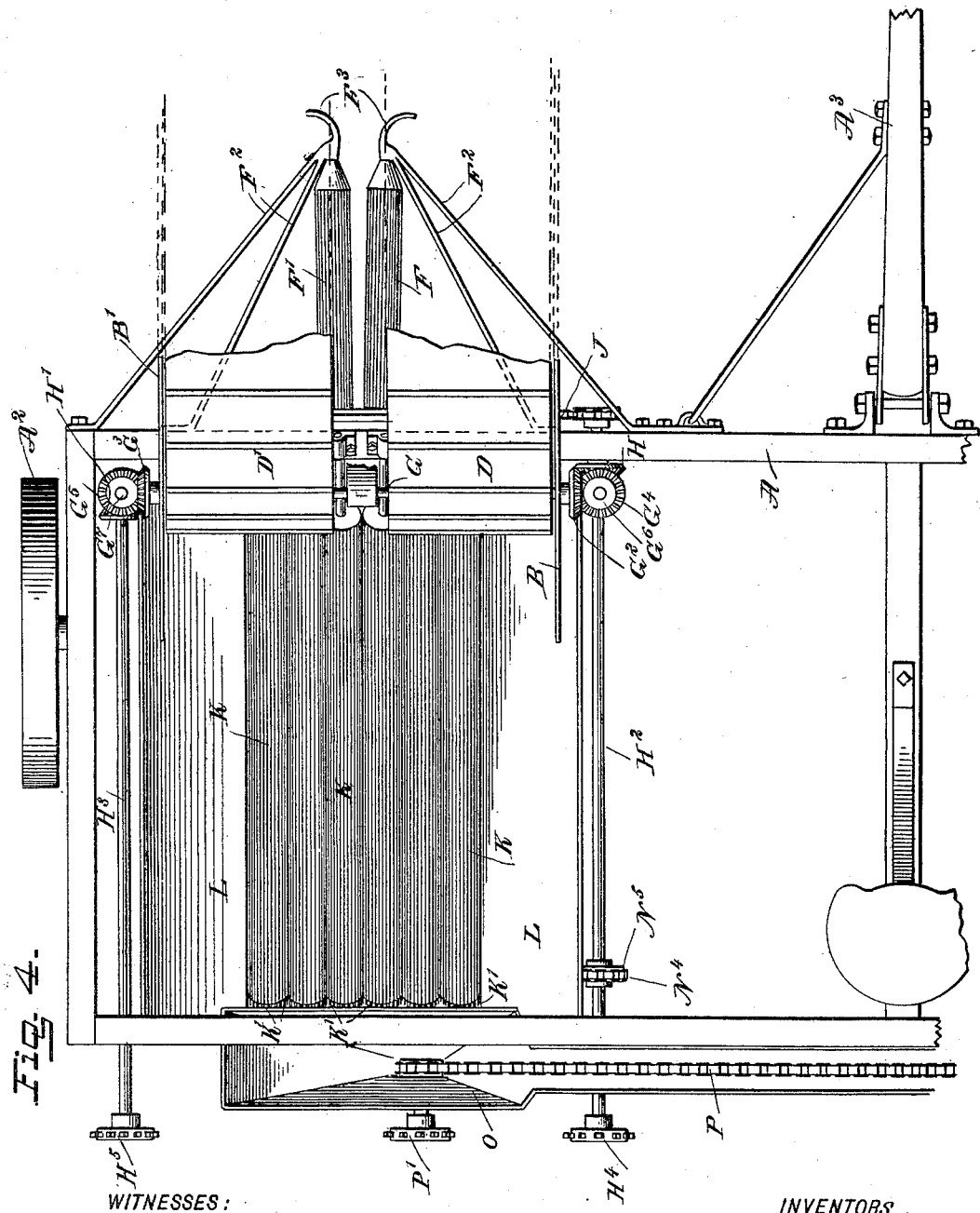

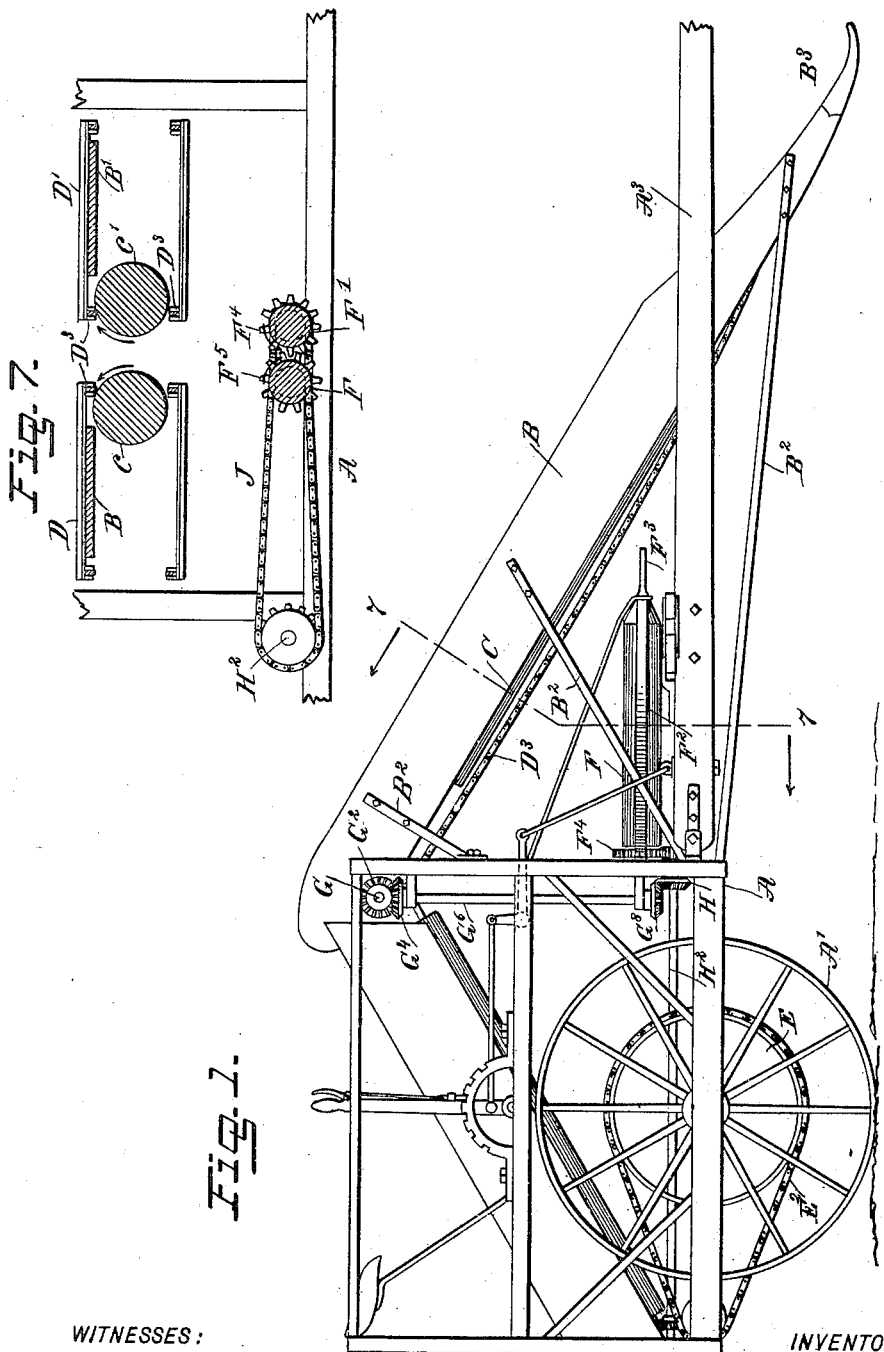

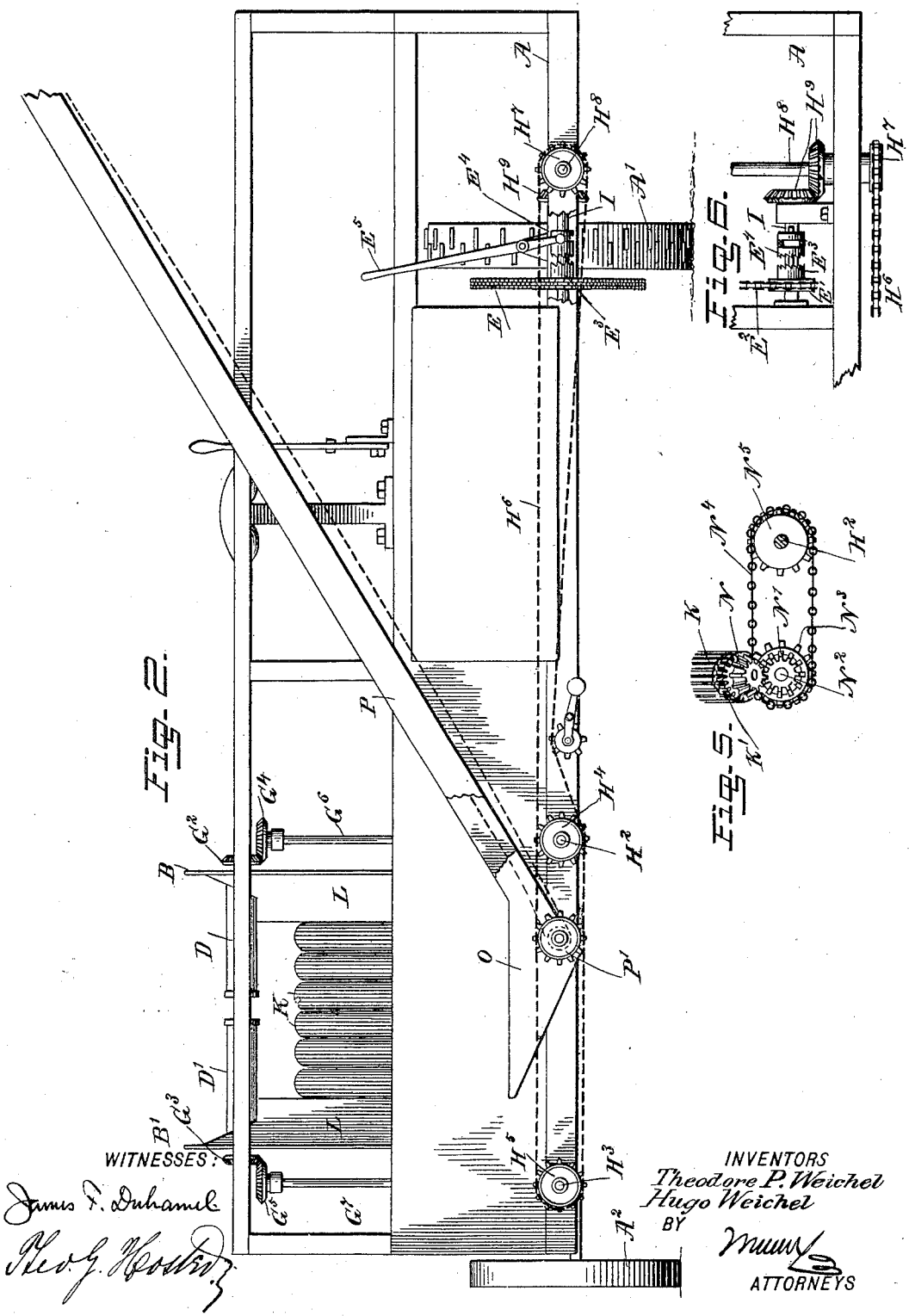

UNITED STATES PATENT OFFICE.

THEODORE P. WEICHEL AND HUGO WEICHEL, OF PLYMOUTH, NEBRASKA.

CORN HARVESTER AND HUSKER.

SPECIFICATION forming part of Letters Patent No. 699,601, dated May 6, 1902.

Application filed September 25, 1901. Serial No. 76,468. (No model.)

*To all whom it may concern:*

Be it known that we, THEODORE P. WEICHEL and HUGO WEICHEL, citizens of the United States, residing near Plymouth, in the county of Jefferson and State of Nebraska, have invented a new and Improved Corn Harvester and Husker, of which the following is a full, clear, and exact description.

The object of the invention is to provide a new and improved corn harvester and husker which is simple and durable in construction, very effective in operation, and arranged to positively pull the ears from the stalks, to tear off the husks, and to finally discharge the husked ears in a wagon or other vehicle traveling alongside the machine.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is an enlarged rear end elevation of the same. Fig. 3 is an enlarged plan view, with part broken out, of the elevator and the pulling device for pulling the ear off the stalk. Fig. 4 is an enlarged plan view of the husking device, the elevator, and the drawing device for drawing the stalk downward while pulling off the ear. Fig. 5 is an enlarged rear end elevation of the driving device for the husking-rolls. Fig. 6 is a plan view of part of the driving mechanism; and Fig. 7 is a cross-section of the pulling device, the elevator, and the driving device.

The improved corn harvester and husker is mounted on a vehicle adapted to be drawn over the field by animal or mechanical power; and the said vehicle consists, essentially, of a main frame A, a driving-wheel A', a supporting-wheel $A^2$, and a suitable tongue $A^3$, to which the animals are hitched. Auxiliary frames B B' are supported by braces $B^2$ from the forward end of the main frame A, and the said auxiliary frames are arranged one alongside the other, with a space between adjacent edges for the passage of the cornstalks, the frames being arranged in an inclined direction, the forward ends being provided with shoes $B^3$ for guiding the cornstalk between the frames B B' and two pulling-rolls C C', journaled on the under side of the frames B B', adjacent to the inner edges thereof, and the space between the rolls decreasing in width from the lower end to the upper end, as plainly indicated in Fig. 3. The rolls C C' are inclined the same as the frames B B' and serve to pull the ear from the stalk passing between the frames as the machine is drawn over the field, and the pulled-off ear falls upon one of two elevator-aprons D D', preferably of the slat type, and mounted to travel on the frames B B', the said rolls C C' and the aprons D D' being driven in unison from a wheel E, rotating with the driving-wheel A'. (See Fig. 1.) Below and somewhat to the rear of the pulling-rolls C C' are arranged a pair of drawing-rolls F F', disposed horizontally and journaled in suitable brackets $F^2$, carried by the main frame A. The pulling-rolls C C', which are preferably smooth, and the said drawing-rolls F F', are spaced apart, with the space decreasing in width from the front of the rolls to the rear thereof, so that the lower portion of the stalks can readily enter between the drawing-rolls and be pulled downward by the same, so that the ear above the pulling-rolls C C' is drawn against the latter and is finally pulled off by the pulling-rolls and rolled by either of the rolls C C' onto the corresponding aprons D D' to be elevated. The forward ends of the brackets $F^2$ are formed with outwardly-bent shoes $F^3$ to insure proper entrance of the stalks to and between the drawing-rolls F F', it being understood that the slots formed between the rolls C C' and D D' are in vertical alinement with each other. The drawing-rolls F F' rotate toward each other in a downward direction to draw the stalks downward, and the pulling-rolls C C' rotate toward each other, but in an upward direction, to pull the ear in a direction opposite to that of the stalk to positively tear the ear from the stalk and deliver the ear to one of the aprons D D'. (See Fig. 7.) The drawing-rolls F F' rotate in unison with the pulling-rolls C C', and in order to give the desired movement to the said rolls and to the aprons D D' the following device is provided.

On the upper end of the shaft $C^2$ of each pulling-roll C is secured a bevel-pinion $C^3$, (see Fig. 3,) in mesh with a bevel gear-wheel $G'$, fastened on a shaft G, extending transversely and journaled in suitable bearings carried by the frames B $B'$. On the outer ends of the shaft G are secured bevel gear-wheels $G^2$ $G^3$, in mesh with bevel gear-wheels $G^4$ $G^5$, secured on the upper ends of vertically-disposed shafts $G^6$ $G^7$, journaled in suitable bearings on the main frame A, the lower ends of the shafts $G^6$ $G^7$ carrying bevel gear-wheels $G^8$, in mesh with bevel gear-wheels H $H'$, secured on the forward ends of shafts $H^2$ $H^3$, extending longitudinally and also journaled in bearings carried by the frame A. On the rear ends of the shafts $H^2$ $H^3$ (see Fig. 2) are secured sprocket-wheels $H^4$ $H^5$, over which passes a sprocket-chain $H^6$, arranged transversely and also passing over a sprocket-wheel $H^7$, secured on a shaft $H^8$, journaled in the main frame A. (See Figs. 2 and 6.) The shaft $H^8$ is connected by bevel gear-wheels $H^9$ with a transverse shaft I, journaled on the main frame A, and on this shaft is mounted to rotate loosely a sprocket-wheel $E'$, connected by a sprocket-chain $E^2$ with the sprocket-wheel E, previously mentioned. The sprocket-wheel $E'$ is provided with a clutch member $E^3$, adapted to be engaged by a clutch member $E^4$, mounted to slide on and to rotate with the shaft I, so that when the machine is drawn forward and the clutch member $E^4$ is in mesh with the clutch member $E^3$ then the shaft I is rotated; but when the clutch member $E^4$ is out of mesh with the clutch member $E^3$ then the rotation of the shaft I ceases. The clutch member $E^4$ is engaged by a shifting-lever $E^5$ under the control of the operator, so as to throw the clutch member $E^4$ in and out of mesh with the clutch member $E^3$. When the clutch member $E^4$ is in mesh with the clutch member $E^3$ and the machine is drawn forward, then a rotary motion is given to the shaft I, and the latter by the gear-wheels $H^9$ rotates the shaft $H^8$, which by the sprocket-wheel $H^7$, the sprocket-chain $H^6$, and the sprocket-wheels $H^4$ $H^3$ imparts a rotary motion to the shafts $H^2$ $H^3$, which in turn by the gear-wheels H, $H'$, and $G^8$ impart a rotary motion to the shafts $G^6$, so that the gear-wheels $G^4$ $G^2$ and $G^5$ $G^3$ impart a rotary motion to the shaft G to drive the drawing-rolls C $C'$ by the action of the gear-wheels $G'$ $C^3$. On the shaft G are secured sets of sprocket-wheels $D^2$, (see Fig. 3,) over which pass sprocket-chains $D^3$, carrying the slat-aprons D $D'$, so that when the shaft G is rotated a traveling motion is given to said aprons in the directions of the arrows $a'$. The drawing-rolls F $F'$ are provided on their rear ends with gear-wheels $F^4$ $F^5$, in mesh with each other to rotate the rolls in unison, the roll $F'$ being driven by a suitable gearing J, such as sprocket wheels and chain connected with the shaft $H^2$. (See Figs. 4 and 7.)

The upper ends of the aprons D $D'$ discharge the ears of corn onto the upper ends of the inclined husking-rolls K, arranged one alongside the other in a transverse direction and extending downwardly and rearwardly, the husking-rolls being journaled at their upper and lower ends in suitable bearings arranged on the frame A. The rolls K are flanked by hopper-boards L, and the lower ends of the rolls are provided with gear-wheels $K'$, in mesh with each other, so that when one of the rolls is driven all the rolls rotate in unison. The husking-rolls K are fluted, so that when an ear of corn is discharged onto the revolving rolls at the upper ends thereof the husk is drawn by a pair of rolls between the same and stripped off the ear, it being understood that as the rolls are close together the ear cannot pass between two adjacent rolls. It is further understood that the ear of corn by its own gravity tends to travel downward over the husking-rolls K during the operation of stripping the husk off the ear, the latter dropping from the bottom of the rolls K to the ground or into a receptacle carried by the frame A. One of the husking-rolls K (see Fig. 5) is provided at its lower end with a bevel gear-wheel N, in mesh with a bevel gear-wheel $N'$, secured on the forward end of a shaft $N^2$, journaled in suitable bearings on the frame A, and on the said shaft $N^2$ is fastened a sprocket-wheel $N^3$, over which passes a sprocket-chain $N^4$, also passing over a sprocket-wheel $N^5$, secured on the shaft $H^2$, previously mentioned, so that when the latter is rotated a rotary motion is given by the sprocket-wheels $N^5$ $N^3$ and the sprocket-chain $N^4$ to the shaft $N^2$, which in turn by the gear-wheels N $N'$ rotates the roll K, and the latter by the gear-wheels $K'$ causes a rotation in unison of all of the rolls K. The lower ends of the latter and the lower ends of the hopper-boards L discharge the husked ear into a hopper O, carried by the frame A at the rear end thereof, and into this hopper O extends the lower end of an elevator P, arranged transversely for carrying the husked ears of corn upward and sidewise to discharge the ear into a wagon traveling alongside the machine. The elevator P is driven from a sprocket-wheel $P'$, engaging the sprocket-chain $H^6$, previously mentioned, so that when the machine is in operation the elevator is actuated for the purpose mentioned.

The operation is as follows: When the machine is drawn over the field, with a row of corn passing into the spaces between the rolls C $C'$ and F $F'$, the rolls F $F'$ exert a downward pull on the stalks, while the rolls C $C'$ prevent the ears from moving downward, and consequently the ears are finally pulled off the stalks and are moved by the pulling-rolls C $C'$ onto the elevator-aprons, which in turn elevate the ears and finally discharge the same at their upper ends onto the upper ends of the husking-rolls K, which tear the husks from the ear, as previously mentioned. The husked ear passes into the hopper O, from which it is moved by the elevator P in an upward and sidewise direction and is finally discharged from the elevator into a wagon traveling alongside the machine.

Having thus described our invention, we claim as new and desire to secure by Letters Patent—

1. A corn harvester and husker, comprising a pair of drawing-rolls for drawing the stalks downward, the said rolls being arranged horizontally and spaced apart, the space between the rolls decreasing in width from the front to the rear thereof, a pair of pulling-rolls similarly spaced for pulling the ear off the stalk at the time the latter is drawn downward, the pulling-rolls being inclined and extending from in front of the drawing-rolls upwardly and rearwardly over the same, means for elevating the pulled-off ear, and a husking device for receiving the ear from the elevating means to remove the husk from the ear, as set forth.

2. A corn harvester and husker, comprising a pair of drawing-rolls for drawing the stalks downward, the said rolls being arranged horizontally and spaced apart, the space decreasing in width from the front to the rear thereof, a pair of pulling-rolls similarly spaced apart and arranged for pulling the ear off the stalk at the time the latter is drawn downward, the pulling-rolls being inclined and extending from in front of the drawing-rolls upwardly and rearwardly over the same, means for elevating the pulled-off ear, a husking device for receiving the ear from the elevating means to remove the husk from the ear, and an elevator for receiving the husked ear from the said husking device to discharge the ear from the machine, as set forth.

3. A corn-harvester, comprising a main frame, an inclined elevator-frame mounted thereon and having a slot in its middle, the forward ends of the frame being provided with shoes for guiding the stalk into the slot, elevator-aprons mounted to travel on the elevator-frame at each side of the slot, similarly-inclined pulling-rolls journaled on the frame at each side of the slot and extending into the same, the pulling-rolls being spaced apart and the space between the rolls decreasing in width from the front or lower end to the rear end thereof, and a horizontally-arranged drawing device for the stalks, the pulling-rolls extending from in front of the drawing device upwardly and rearwardly over the same, as set forth.

4. A corn-harvester, comprising a main frame, an inclined elevator-frame made in two parts spaced apart and having shoes at their forward ends to guide the stalk into the space between the members of the frame, a pair of drawing-rolls for drawing the stalk downward and arranged below the elevator-frame and extending horizontally, brackets carried by the main frame in which the drawing-rolls are journaled, the said drawing-rolls being spaced apart, the space decreasing in width from the front of the rolls to the rear thereof, outwardly-bent shoes at the forward ends of the brackets to guide the stalks between the drawing-rolls, and pulling-rolls arranged above and at an inclination to the drawing-rolls for pulling the ears in a direction opposite to that in which the stalk is drawn by the drawing-rolls, the inclination of the pulling-rolls corresponding with that of the elevator-frame, as set forth.

5. A corn-harvester having a drawing device comprising a pair of driven rolls horizontally arranged and spaced apart for engaging the stalk and drawing the same downward, and a pulling device comprising a pair of inclined rolls extending from in front of the drawing-rolls upwardly and rearwardly above the same, and likewise spaced apart, the spaces between the said pairs of rolls being in vertical alinement, the pulling-rolls operating in unison with the drawing-rolls to pull the ear off the stalk while the latter is drawn downward, as set forth.

6. A corn-harvester having a drawing device comprising a pair of driven rolls, horizontally arranged and spaced apart, the space decreasing in width from the forward to the rear ends of said rolls, the said rolls being arranged to engage the stalk and draw the same downward, a pulling device comprising a pair of inclined pulling-rolls extending from in front of the drawing-rolls upwardly and rearwardly above the same and similarly spaced apart, the pulling-rolls operating in unison with the drawing-rolls to pull the ear off the stalk while the latter is drawn downward, and an elevator for receiving the pulled-off ear from the said pulling device and moving it upward and rearward away from the pulling device, as set forth.

7. A corn-harvester, having a pair of driven drawing-rolls for engaging the stalk and drawing the same downward, the drawing-rolls extending in a horizontal direction and a pair of driven pulling-rolls for pulling the ear of the stalk engaged at the time by the drawing-rolls, the pulling-rolls being inclined and extending from in front of the drawing-rolls upwardly and rearwardly over the same, as set forth.

8. A corn-harvester, having a pair of driven drawing-rolls for engaging the stalk and drawing the same downward, the drawing-rolls extending in a horizontal direction and rotating toward each other in a downward direction, and a pair of driven pulling-rolls rotating toward each other in an upward direction and adapted to pull the ear off the stalk engaged at the time by the drawing-rolls, the pulling-rolls being inclined and extending from in front of the drawing-rolls upwardly and rearwardly over the same, as set forth.

9. A corn-harvester having a pair of horizontally-arranged driven drawing-rolls for engaging the stalk and drawing the same downward, and a pair of inclined driven pulling-rolls extending from in front of the drawing-rolls upwardly and rearwardly over the same, the pulling-rolls being smooth and the drawing-rolls being fluted, and the rolls in each pair being spaced apart and arranged obliquely one to the other, as set forth.

10. A corn-harvester, having a pair of horizontally-arranged driven drawing-rolls for engaging the stalk and drawing the same downward, the drawing-rolls being fluted and rotating toward each other in a downward direction and a pair of inclined driven pulling-rolls rotating toward each other in an upward direction, the pulling-rolls being smooth and extending from in front of the drawing-rolls upwardly and rearwardly over the same, the rolls in each pair being spaced apart and arranged obliquely one to the other, the forward ends of the rolls in each pair being spaced farthest apart, as set forth.

11. A corn-harvester, comprising a wheeled frame, an inclined elevator-frame mounted therein and having a slot in its middle extending longitudinally, horizontally-arranged drawing-rolls journaled in brackets carried by the main frame, pulling-rolls journaled in the elevator-frame, and inclined to correspond therewith, the pulling-rolls extending from in front of the drawing-rolls upwardly and rearwardly over the same, and elevating slat-aprons mounted to travel in the elevator-frame on opposite sides of said pulling-rolls, as set forth.

12. A corn harvester and husker, comprising a wheeled frame, an inclined elevator-frame mounted thereon, and having a slot in its middle, elevator-aprons mounted to travel on the elevator-frame at each side of the slot, pulling-rolls inclined to correspond with the elevator-frame and journaled thereon at each side of the slot, horizontally-arranged drawing-rolls for drawing the stalks downward, and arranged below the inclined pulling-rolls, brackets carried by the main frame in which the said drawing-rolls are journaled, a husking device for receiving the ears from the elevator-aprons, and means for discharging the husked ears from the machine, as set forth.

In testimony whereof we have signed our names to this specification in the presence of two witnesses.

THEODORE P. WEICHEL.
HUGO WEICHEL.

Witnesses:
HENRY J. BRUENGER,
JOHN WEICHEL, Jr.